(12) United States Patent
Borin et al.

(10) Patent No.: US 7,506,217 B2
(45) Date of Patent: Mar. 17, 2009

(54) APPARATUS AND METHOD FOR SOFTWARE-BASED CONTROL FLOW CHECKING FOR SOFT ERROR DETECTION TO IMPROVE MICROPROCESSOR RELIABILITY

(75) Inventors: Edson Borin, Campinas (BR); Cheng C. Wang, San Jose, CA (US); Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 469 days.

(21) Appl. No.: 11/325,773

(22) Filed: Dec. 30, 2005

(65) Prior Publication Data

US 2007/0174750 A1    Jul. 26, 2007

(51) Int. Cl.
*G06F 11/00* (2006.01)
(52) U.S. Cl. .......................................... 714/51; 714/732
(58) Field of Classification Search ................... 714/51, 714/732
See application file for complete search history.

(56) References Cited

U.S. PATENT DOCUMENTS

| | | | | |
|---|---|---|---|---|
| 5,559,884 | A * | 9/1996 | Davidson et al. ............ | 713/187 |
| 5,974,529 | A * | 10/1999 | Zumkehr et al. .............. | 712/41 |
| 6,357,024 | B1 * | 3/2002 | Dutton et al. .................. | 714/45 |
| 6,415,394 | B1 * | 7/2002 | Fruehling et al. ............. | 714/30 |
| 6,571,363 | B1 * | 5/2003 | Steiss .......................... | 714/732 |
| 6,678,837 | B1 * | 1/2004 | Quach et al. .................. | 714/38 |
| 6,802,006 | B1 * | 10/2004 | Bodrov ........................ | 713/187 |
| 7,036,111 | B2 * | 4/2006 | Dollin et al. ................. | 717/126 |

OTHER PUBLICATIONS

Shivakumar, P., et al., "Modeling the Effect of Technology Trends on the Soft Error Rate of Combinational Logic", Proc. of 2002 Int'l Conf. on Dependable Systems and Networks, 2002 IEEE, 10 pp.
O'Gorman, T.J., et al., "Field testing for cosmic ray soft errors in semiconductor memories", IBM J. Res. Develop, vol. 40, No. 1, Jan. 1996, pp. 41-49.
Saxena, N.R., et al., "Control-Flow Checking Using Watchdog Assists and Extended-Precision Checksums", IEEE Trans. on Computers, vol. 39, No. 4, Apr. 1990, pp.

(Continued)

*Primary Examiner*—Christopher S McCarthy
(74) *Attorney, Agent, or Firm*—Blakely, Sokoloff, Taylor & Zafman LLP

(57) ABSTRACT

A method and apparatus for software-based control flow checking for soft error detection. In one embodiment, the method includes the instrumentation of one basic block of a target program to update a signature register with a successor basic block signature at an end of the basic block. In addition, the basic block is instrumented to verify that contents of the signature register match a basic block signature at a beginning of the basic block. In one embodiment, an instruction is inserted within the basic block to cause the signature register to store a predetermined value if the contents of the signature register match a basic block signature. In one embodiment, a basic block may be subdivided into a plurality of regions; each region is assigned a signature and instrumented to update the signature register at a beginning of each region. Other embodiments are described and claimed.

9 Claims, 11 Drawing Sheets

OTHER PUBLICATIONS

Michel, T., et al., "A New Approach to Control Flow Checking Without Program Modification", 1991 IEEE, pp. 334-341.

Alkhalifa, Z., et al., "Design and Evaluation of System-Level Checks for On-Line Control Flow Error Detection", IEEE Trans. on Parallel and Distributed Systems, vol. 10, No. 6, Jun. 1999, pp. 627-641.

Oh, N., et al., "Control Flow Checking by Software Signatures", IEEE Trans. on Reliability, Apr. 2000, pp. i, 1-30.

Reis, G., et al., "SWIFT: Software Implemented Fault Tolerance," Proc. Intl. Symp. Code Generation and Optimization, pp. 243-254; Mar. 20-23, 2005; 12 pages.

* cited by examiner

US 7,506,217 B2

APPARATUS AND METHOD FOR SOFTWARE-BASED CONTROL FLOW CHECKING FOR SOFT ERROR DETECTION TO IMPROVE MICROPROCESSOR RELIABILITY

FIELD

One or more embodiments relate generally to the field of integrated circuit and computer system design More particularly, one or more of the embodiments relate to a method and apparatus for software-based control flow checking for soft error detection to improve microprocessor reliability.

BACKGROUND

Transient faults, also referred to as "soft-errors" or "single-event upsets" (SEUs), are intermittent faults that do not consistently occur. Generally, these faults are caused by external events such as neutron and alpha particles striking, or power supply and interconnect noise. Although these faults do not cause permanent damage, the faults may result in incorrect program execution by altering signal transfers or stored values.

Protection against soft-errors is generally limited to high-availability systems and safety-critical applications; however, new trends in microprocessor manufacturing are pushing these faults under the spotlight. Transistors are becoming increasingly faster and smaller with tighter noise margins, making processors more susceptible to soft-errors. Indeed, soft-errors are already changing the way the industry looks at processors design. Major customers have been lost due to server crashes caused by soft-errors; and the fear of cosmic ray strikes led an original equipment manufacturer (OEM) to protect most of the hardware logic of a recent chip design with some form of error detection.

Most modern microprocessors already incorporate mechanisms for detecting soft-errors. Memory elements, particularly caches, are protected using mechanisms such as error-correcting codes (ECC) and parity. The protection is typically focused on memory because the techniques are well understood and do not require expensive, extra circuitry. Moreover, caches take up a large part of the chip area in modern microprocessors.

Recent studies show that in a near future the soft-error rate in combinational logic will be comparable to that of memory elements; and protecting the entire chip, instead of only the memory elements, will be on top of designers' to do lists. Several works have investigated redundancy techniques to provide protection and reliability against soft-errors. Hardware-based approaches generally rely on inserting redundant hardware, such as duplicating functional units or even the entire processor.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for software-based control flow checking for soft error detection to improve microprocessor reliability are described. In one embodiment, the method includes the instrumenting of at least one basic block of a target program to update a signature register with a successor basic block signature at an end of the basic block. Once the at least one basic block is instrumented, the successor basic block of the at least one basic block is instrumented to verify that contents of the signature register match the successor basic block signature at a beginning of the successor basic block. In one embodiment, an instruction is inserted within the successor basic block to cause the signature register to store a predetermined value if the contents of the signature register match the successor basic block signature. In one embodiment, a basic block may be subdivided into a plurality of regions. Once subdivided, in one embodiment, each region is assigned a signature instrumented to update the signature register at a beginning of each region.

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that the invention may be practiced without such specific details. In other instances, control structures and gate level circuits have not been shown in detail to avoid obscuring the invention. Those of ordinary skill in the art, with the included descriptions, will be able to implement appropriate logic circuits without undue experimentation.

In the following description, certain terminology is used to describe features of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a microcontroller, or the like.

In one embodiment, the method includes instrumentation of at least one basic block of a target program to update a signature register with a successor basic block signature. In one embodiment, the basic block is instrumented to include code to update the signature register at an end of the base block. In one embodiment, the successor basic block is also instrumented to verify that the value contained within the signature register matches the successor basic block signature. In one embodiment, code to perform such verification is inserted at a beginning of the successor basic block.

Figure 1:
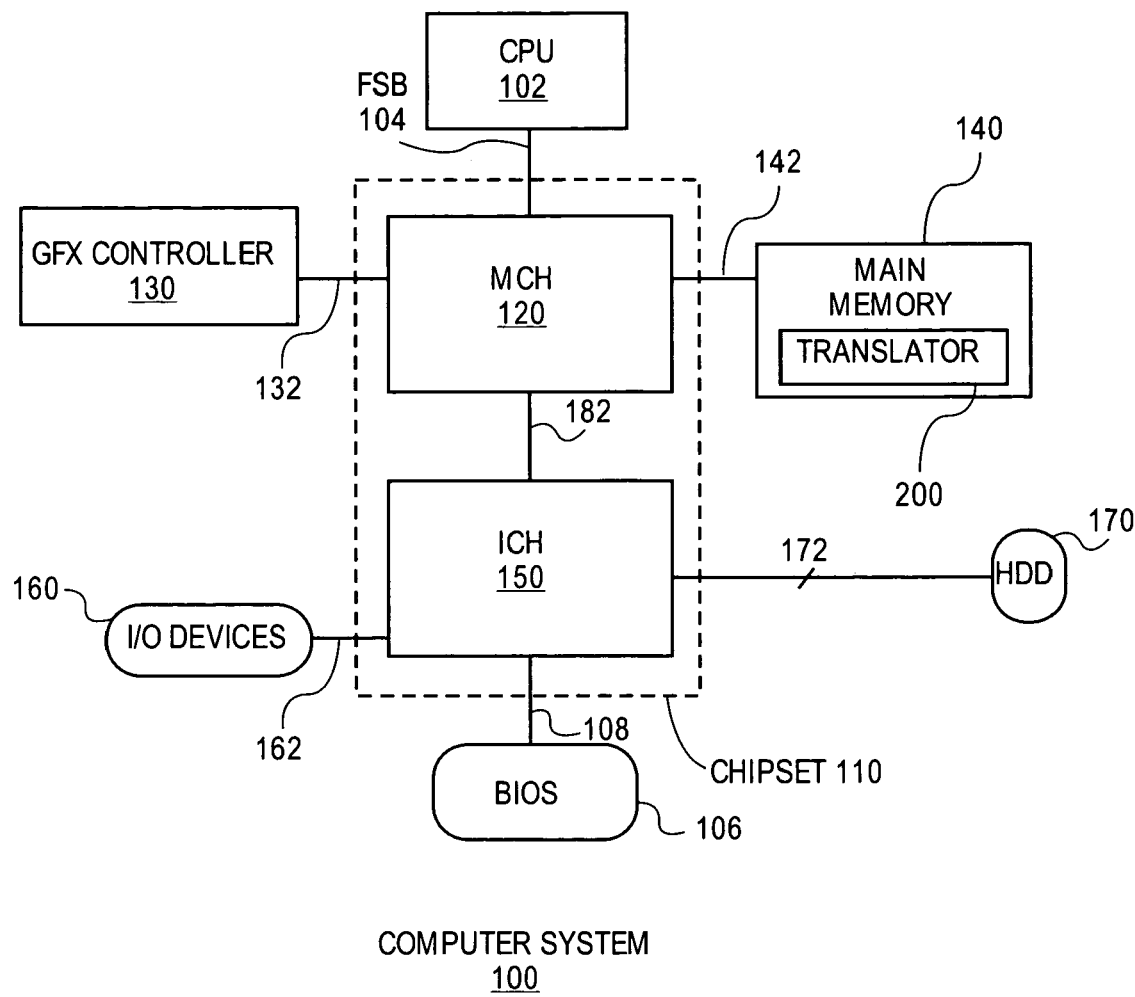
FIG. 1 is a block diagram illustrating a computer system including a dynamic binary translator to provide software-based control flow checking for soft error detection to improve microprocessor reliability, in accordance with one embodiment.

FIG. 1 is a block diagram illustrating a computer system 100 including a dynamic binary translator 200 to provide software-based control flow for soft error checking, in accordance with one embodiment. Representatively, computer system 100 comprises a processor system bus (front side bus (FSB)) 104 for communicating information between processor (CPU) 102 and chipset 110. As described herein, the term "chipset" is used in a manner to collectively describe the various devices coupled to CPU 102 to perform desired system functionality. In one embodiment, CPU 102 may be a multicore chip multiprocessor (CMP).

Representatively, chipset 110 may include memory controller hub (MCH) 120 coupled to graphics (GFX) controller 130 via an interconnect 132. In an alternative embodiment, GFX controller 120 is integrated into MCH 120 such that, in one embodiment, MCH 120 operates as an integrated graphics MCH (GMCH). Representatively, MCH 120 is also coupled to main memory 146 via interconnect 142. In one embodiment, main memory 140 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data.

As further illustrated, chipset may include an input/output (I/O) controller hub (ICH) 150. Representatively, ICH 150 may include a universal serial bus (USB) link or interconnect 102 to couple one or more I/O devices 160 to ICH 150. In an alternative embodiment, I/O devices 160 may be coupled to ICH 150 via a point-to-point link, including, but not limited to, peripheral component interconnect (PCI) Express (PCI-Express) or other like point-to-point interconnect. Likewise, a serial advance technology attachment (SATA) 172 may couple hard disk drive devices (HDD) 170 to ICH 150. In one embodiment, basic input/output system (BIOS) 106 initializes computer system 100.

Although chipset 110 is illustrated as including a separate MCH 120 and ICH 150, in one embodiment, MCH 120 may be integrated within CPU 102. In an alternative embodiment, the functionality of MCH 120 and ICH 150 are integrated within chipset 110. In one embodiment, dynamic binary translator 200 may be implemented within computer systems including an MCH integrated within a CPU, an MCH and ICH integrated within a chipset, as well as a system on-chip. Accordingly, those skilled in the art should recognize that FIG. 1 is provided to illustrate one embodiment and should not be construed in a limiting manner.

In one embodiment, dynamic binary translator (DBT) 200 provides dynamic binary control flow error detection. As described herein, a "control flow error" is a deviation from a program's normal instruction execution flow. As further described herein, "transient faults" (also known as "soft errors") are intermittent faults that do not occur consistently. To protect systems from transient faults, designers typically introduce redundant hardware. The classic example is error control codes (ECC) or parity bits present in cache and memory systems. Although such redundant hardware is readily available in cache memory systems, processors' data path and control unit protection through hardware implemented redundancy comes at an expensive cost.

Figure 2:
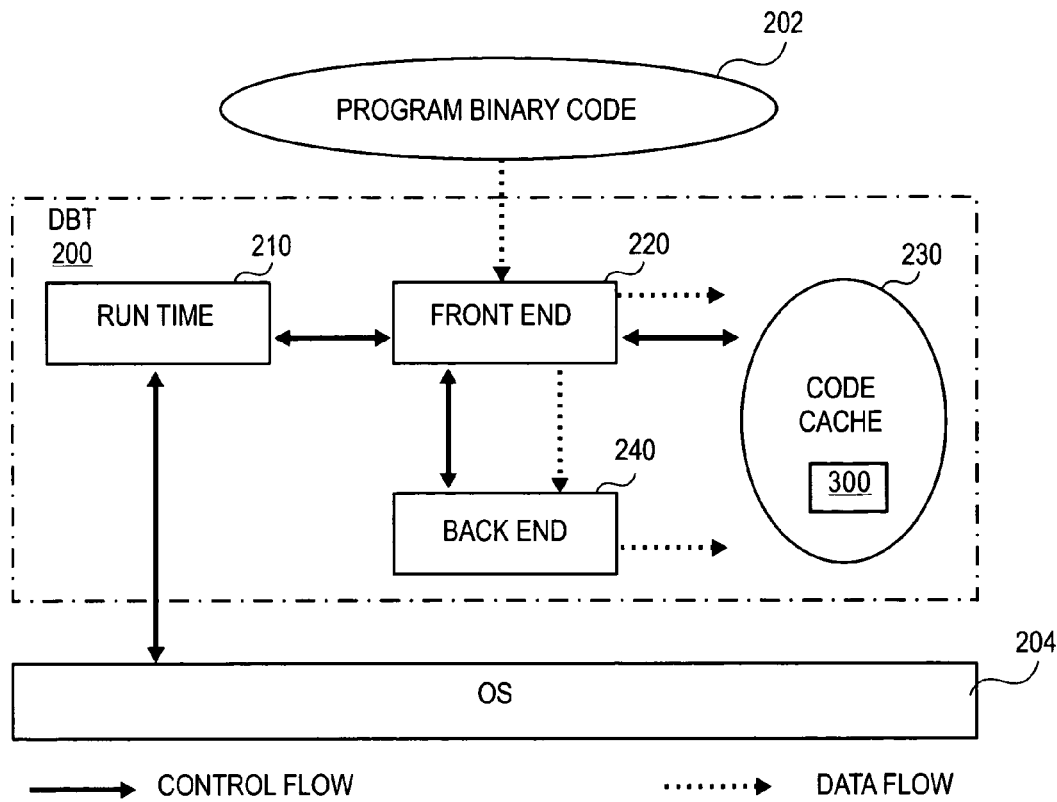
FIG. 2 is a block diagram further illustrating the dynamic binary translator of FIG. 1, in accordance with one embodiment.

In one embodiment, DBT 200, as further illustrated in FIG. 2, provides a software approach to redundancy as an alternative to redundant hardware. In one embodiment, the techniques provided by DBT 200 may be implemented in other like compiler techniques or other techniques for processing source program code to incorporate software-based control flow error checking, in accordance with one embodiment. Accordingly, in one embodiment, rather than duplicating program execution on more than one thread, DBT 200 duplicates program execution in the same program thread.

FIG. 2 further illustrates DBT 200 of FIG. 1, in accordance with one embodiment. Representatively, DBT 200 runs on top of operating system (OS) 204 as a user level runtime system. In one embodiment, program binary code 202 is dynamically translated to generate target program code 300 with software-based control flow error checking according to one embodiment and stored into code cache 220. Subsequently, the translated code 300 is executed under the control of DBT 200, which allows the application of different binary translation techniques to code 300, such as, compatibility support, security checking, reliability enforcement, performance enforcement, etc.

Representatively, DBT 200 may include three individual modules, runtime module 210, front end module 220 and back end module 240. In one embodiment, the runtime module 210 provides system support for DBT 200. Runtime module 210 may automatically load original program code 202 into memory and initialize the program execution context at program startup. To facilitate program execution, runtime module 210 may handle system events, such as, OS callbacks, exceptions, dynamic load library, code self modification or other like system events.

In one embodiment, front end module 210 manages program execution for dynamic binary translation. In one embodiment, front end 210 dynamically recognizes the original program instructions, translates such instructions in code cache 220 using different dynamic binary translation techniques, and controls the code execution from code cache 220. In one embodiment, for system related features in program 202, front end module 220 may interact with runtime module 210 to receive system support, to provide optimization to dynamic binary translation In one embodiment, front end module 220 may also collect program profiling information during code execution and selects hot traces based on the profiling information for runtime optimization. In one embodiment, back end module 240 performs runtime optimization for the dynamic binary translation. Back end module 240 may generate an intermediate representation (IR) from the hot traces selected by front end module 220. Subsequently, back end module 240 performs optimizations on the IR and provides optimized code 300 into code cache 230 to improve performance.

In one embodiment, DBT 200 may be directed to a special class of faults, referred to as "control flow errors," that occur when a processor jumps to an incorrect next instruction due to a soft error. As described herein, a control flow error is a deviation from the program's normal instruction flow execution. This error can be a result of a fault in a comparison or even a change in the instruction pointer (IP) register due to external interference. Control flow errors are classified into two main categories:

Branch-Error: When the error occurs in a branch instruction (mistaken branch, or branch to a random address, due to an error in the branch flag or in the target address). Although the error occurs at the branch instruction, it could be caused by instructions executed earlier than the branch instruction, such as instructions that generate the flags which affect the branch instruction.

IP-Error: When the error occurs in any place, due to a change in the IP register.

IP-errors are very hard to cover with software-based control flow reliability techniques. For example, take the instruction: a=a+c. If after executing this instruction the IP turns back to the same instruction and executes it again, the fault generates an error, but it cannot be detected. Therefore, assume that the IP register is reliable and effort should be concentrated on branch-errors.

When a fault occurs in a branch instruction, there are the following possibilities:
Mistaken branch: when it is supposed to jump, but falls through (or vice versa).
Random target: when it jumps to an address other than the jump target or the next instruction (fall through).
  Same-BB-branch: when the execution jumps to the same basic block (back wards).
    BB-Beginning: when the execution jumps to the beginning of the basic block;
    BB-Middle: when the execution jumps to the middle of the basic block;
  Other-BB-branch: when the execution jumps to another basic block.
    BB-Beginning: when the execution jumps to the beginning of the basic block;
    BB-Middle: when the execution jumps to the middle of the basic block:
  Outside-code-branch: when the execution jumps to a region of memory that does not have code:

TABLE 1

| Error Class | Target | Target BB | Target BB Position |
|---|---|---|---|
| A | Mistaken branch; | N/A | Beginning; |
| B | Random target; | same BB | Beginning; |
| C | Random target; | same BB | Middle; |
| D | Random target; | other BB | Beginning; |
| E | Random target; | other BB | Middle |

Figure 3:
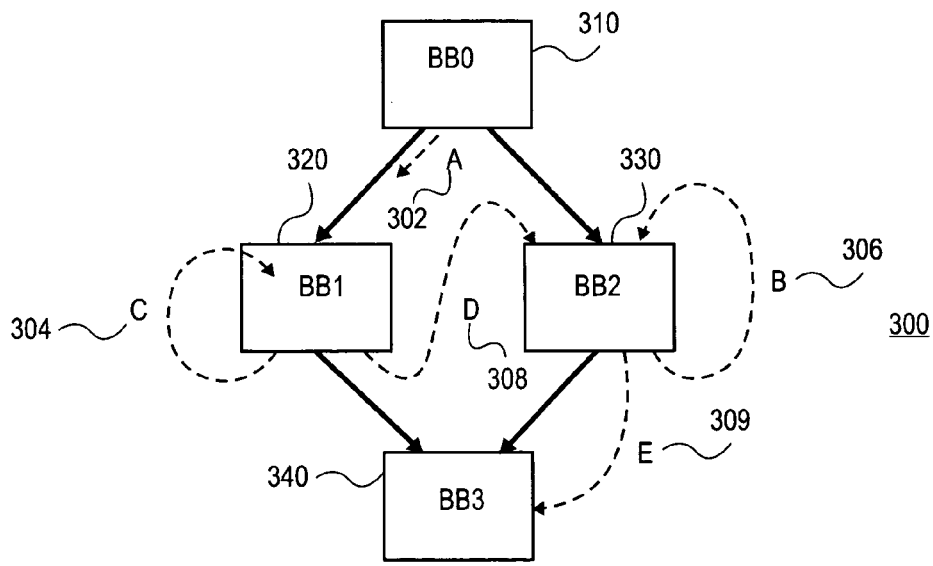
FIG. 3 is a block diagram illustrating branch error categories, in accordance with one embodiment.

Table 1 illustrates the classification of branch error categories. FIG. 3 is a control flow graph 300 to illustrate the branch error categories, as shown in Table 1, in accordance with one embodiment. Representatively, the solid lines are valid control flows and the dashed lines represent different categories of branch errors. As shown in FIG. 3, control flow graph includes basic block zero (BB0) 310, basic block one (BB1) 320, basic block two (BB2) 330 and basic block three (BB3) 340.

Representatively, mistaken branch 302 is shown regarding a branch as mistakenly taken from BB0 310 to BB1 320. A random target branch error, which branches to the beginning of the same basic block, is shown as branch error B 306. Random target branch error C, which branches to the middle of the same basic block, is identified by dashed arrow 304. In addition, random target branch error D, which branches to the beginning of another basic block are indicated by dashed arrow 308 and random target branch error E, which branches to the middle of another basic block, is shown as dashed arrow 309.

Conventional control flow checking may be used to detect one or more of the branch error categories listed in Table 1. However, conventional control flow checking is generally unable to detect each of the branch error categories listed in Table 1. Control flow checking is generally used to detect errors by comparing a runtime signature of a basic block with a precomputed signature assigned to the basic block. Although some have used hardware to assist the control flow checking, in one embodiment, DBT 200 provides software-based control flow checking.

In one embodiment, to implement control flow checking techniques, an instruction is inserted to check and update basic block signatures in every translated basic block. As described herein, a basic block is a straight line piece of code without any jumps or jump targets in the middle of the basic block. Jump targets, if any, start a basic block and jumps end the basic block. Basic blocks are usually the basic unit to which compiler optimizations are applied and may be used to form the vertices, or nodes, in a control flow graph. As further described herein, the blocks to which control may transfer after reaching the end of the block are referred to herein as "block successors" and the blocks from which control may have come when entering a block are referred to herein as the block's "predecessors."

Figures 4, 6:
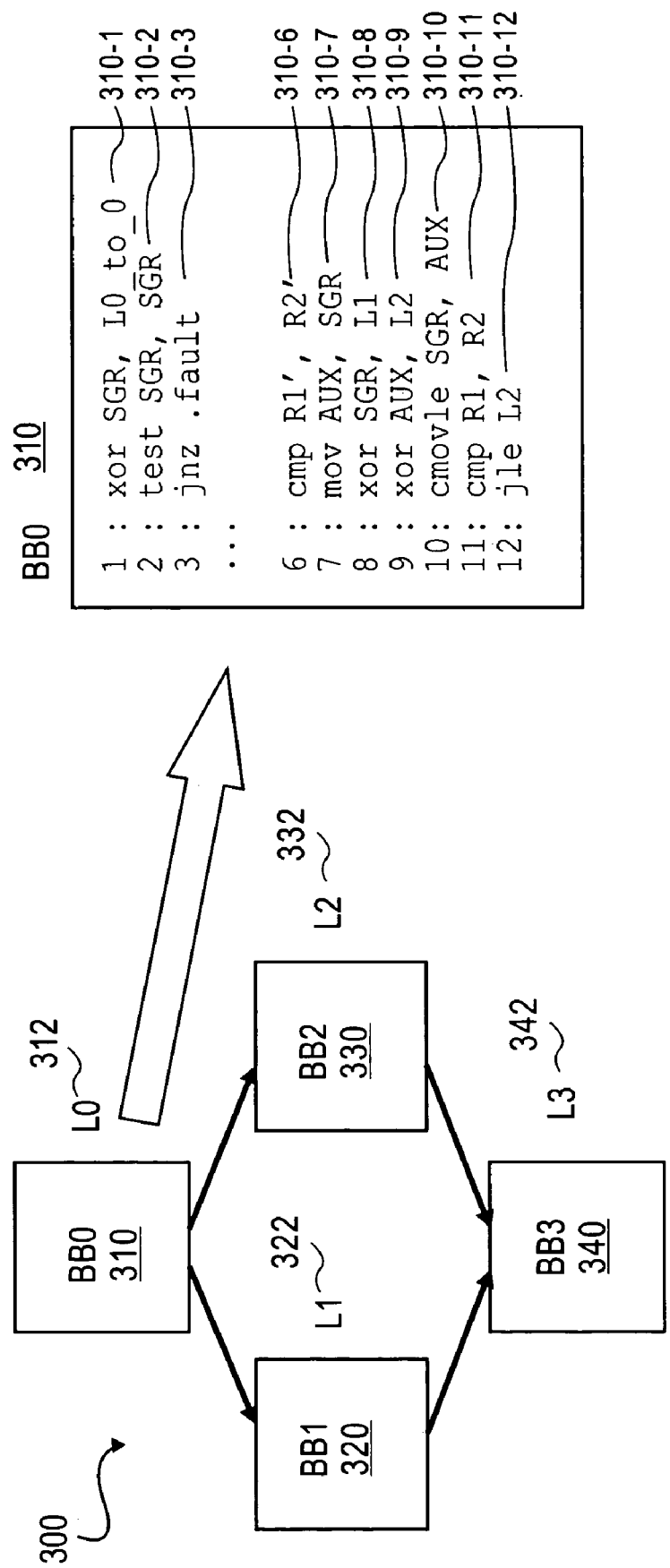
FIG. 4 is a block diagram illustrating a control flow graph (CFG) illustrating control flow checking, in accordance with one embodiment.
FIG. 6 is a block diagram further illustrating program code for performing edge control flow checking, in accordance with one embodiment.

In one embodiment, control flow error detection is performed with two software-based control flow checking techniques. In one embodiment, a first software-based control flow checking technique, which may be referred to as "edge control flow" (EdgCF) is described according to one embodiment. FIG. 4 further illustrates control flow graph (CFG) 300 to illustrate edge control flow checking, in accordance with one embodiment.

Figures 5A, 5B:
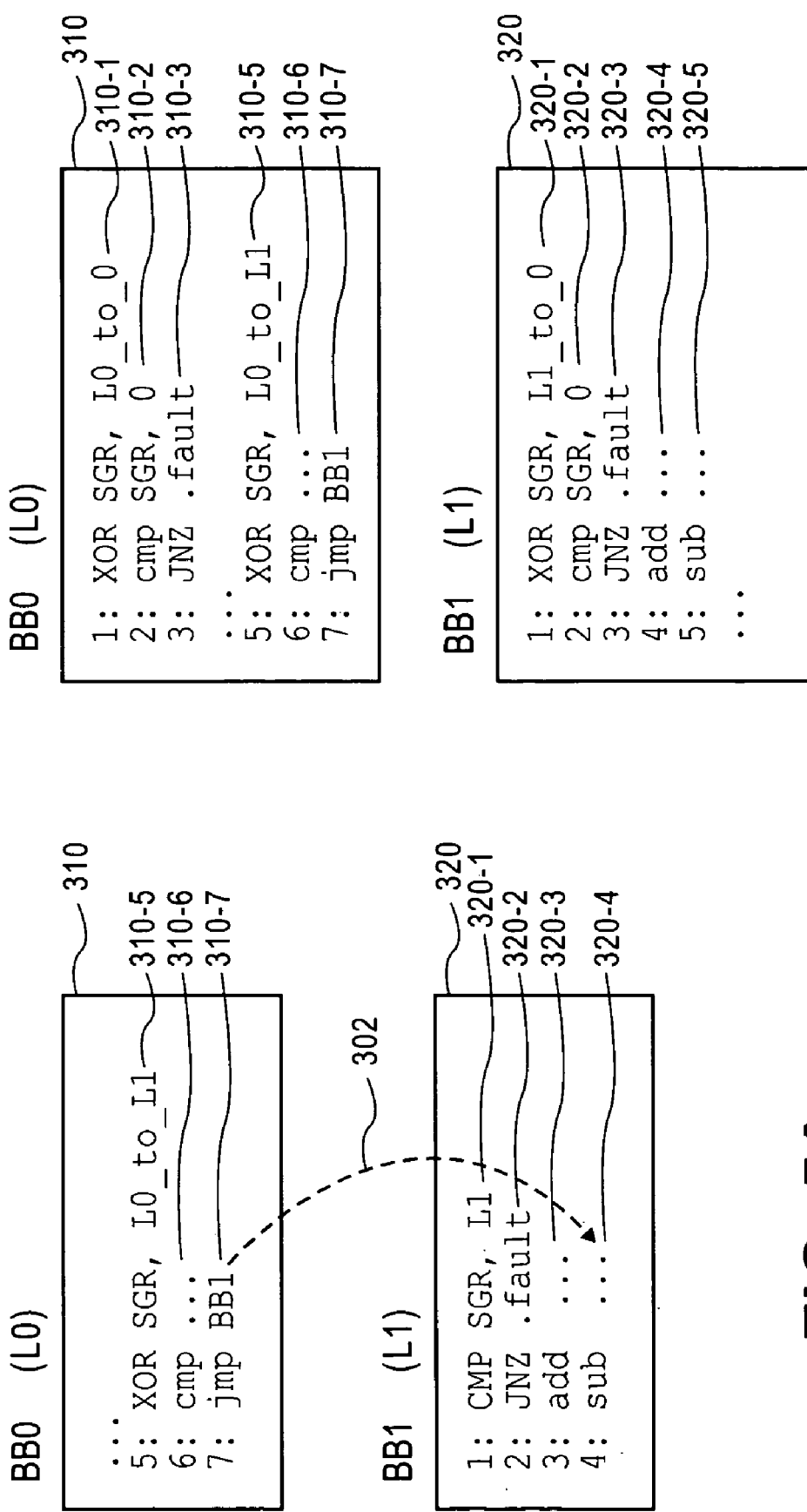
FIGS. 5A and 5B are block diagrams illustrating program code for performing edge control flow checking, in accordance with one embodiment.

In one embodiment, CFG 300 illustrates the basic block signatures assigned to each basic block of CFG 300. Representatively, BB0 310 is assigned basic block signature L0 312, and BB1 320 is assigned basic block signature L1 322. In addition, BB2 330 is assigned basic block signature L2, labeled as item 332, whereas BB3 340 is assigned basic block signature L3, which is labeled as item 318. FIGS. 5A and 5B illustrate one embodiment of the code of BB0 310 and BB1 320 to provide EdgCF checking technique.

In one embodiment, the EdgCF technique maintains a signature register (SGR) with a target or successor basic block signature during program edges (branches). In one embodiment, the SGR register is implemented by using a general purpose register that is updated (through a transformation) at a beginning and end of the basic block. In one embodiment, the transformation that updates the SGR register is required to use the old value of the SGR so that if the old value is wrong, the new value will also be wrong. Therefore, once a signature within the SGR register is invalid (for example, due to a control flow), the signature contained within the SGR register will remain invalid.

In one embodiment, the EdgCF Checking Technique updates the SGR with a successor block signature at the end of the current basic block and checks the successor basic block signature at the beginning of the successor basic block. FIG. 5A shows an example of SGR being updated and checked. Instruction 310-5 updates the SGR with successor basic block signature (L1) 314. In one embodiment, L0-to-L1 is a constant value that when combined with basic block signature (L0) 312 L0, using for example, a logical exclusive OR (XOR) operation, generates successor basic block signature 314 or L1 signature 314. Instructions 310-1 and 310-22 check the signature within the SGR.

The example in FIG. 5A still does not detect faults that jump to the middle of successor target basic block 320. If, due to a fault, instruction 310-7 branches directly to instruction 320-4 of BB2 300, execution skip instruction 320-3, and the code does not detect the fault. The undetected fault in FIG. 5A occurs because control flow jumps between two points that have the same signature (L1) 322. In other words, FIG. 5A illustrates branch error contingency E, as shown in Table 1. In one embodiment, to detect this kind of fault, the signature is also updated in the beginning of the basic block. FIG. 5B shows the EdgCF technique updating SGR in the beginning of the basic blocks.

In one embodiment, the EdgCF technique modifies SGR register so that between basic blocks (in the control flow edges) SGR contains the correct successor basic block signature, and in the middle of the basic block contains a SGR zero value. The technique is able to detect the fault in FIG. 5A. Although this fault (branch error category E) skips the checking code in BB1 320, the SGR value is also wrong in the successor basic block, and the next checking code will detect the fault.

Accordingly, as shown in FIGS. 5A and 5B, a first transformation (in the beginning of the basic block) is an instruction 310-1 that modifies the contents of the SGR register so that if the SGR register contains the correct signature (the current basic block signature), the result of such an operation is zero. Therefore, in every basic block after the first transformation of the SGR register value, the SGR register value should contain a zero value, which may be referred to herein as a "predetermined value").

In accordance with such an embodiment, if a control flow error occurs, the value contained within the SGR register after such transformation will be a non-zero value. Accordingly, as shown in FIG. 5B, right after the first transformation, code (310-2 and 310-3) is inserted to check the control flow signature. Representatively, if the SGR register contains a non-zero value, a function (310-3) may be called to handle (report or fix) the error.

FIG. 6 further illustrates control flow graph 300 to illustrate a second transformation, which may be performed at an end of the basic block 310 to update the SGR register value with the next, or successor, basic block signature. In one embodiment, the second transformation at the end of the basic block may be performed according to the following conditions:

If the basic block has only one successor basic block, insert one instruction to transform the current value of the SGR register (zero) to the new value (the successor basic block signature);

If the basic block has a conditional branch, conditional instructions (such as, predicated instructions or conditional branches) are used to update the signature according to the next basic blocks; and If the basic block has a dynamic branch, such as, indirect jumps/calls, or a return instruction, code is generated to get the dynamic target address and map it to the target basic block signature. To avoid the cost of mapping the address to the signature, in one embodiment, the address of the first instruction in a basic block is used as the basic block signature. This is very convenient, since this way, there are always unique signatures and the address to signature mapping has no cost.

FIG. 6 illustrates an example of a basic block 310 with a conditional branch instruction 310-12. Instructions 310-6 to 310-10 update the SGR register (using the conditional move instruction "cmov") to the next basic block signature (L1 or L2) according to the branch condition. Representatively, FIG. 6 illustrates an example of a basic block 310 with a conditional branch instruction to check the control flow. The first instruction 310-1 updates the SGR register using the basic block signature (L0) 312. Instructions 310-2 and 310-3 test the SGR value to check the control flow. In addition, instructions 310-6 to 310-10 update the SGR register (using the conditional move instruction "cmov") to a successor (next) basic block signature according to the branch condition.

Although the example uses the XOR function and the cmov instruction to update the signature, it should be recognized that such instructions are not required. In one embodiment, a load effective address (LEA) instruction may be used as a transformation instruction to avoid unnecessary updates to flags, which may be a side effect of using the XOR instruction. If a conditional branch instruction is used to update the SGR signature at an end of the basic block (instead of the "cmovcc" instruction), the number of possible branch error points is augmented. Accordingly, there may be a transient error in the branch instruction used to update the signature.

The examples in FIG. 6 use a branch instruction to check the signature. This instruction is a new potential source of branch errors, but the EdgCF and the previous techniques do not detect these faults. Performance overhead is also experienced when using the instruction "cmov" to update the signature at the end of basic block 310. To overcome these problems, the Region based Control Flow technique is proposed.

In one embodiment, Region based Control Flow (RCF) Checking Technique attributes signatures to regions, instead of basic blocks. As described herein, a region is a small sequence of instructions; therefore, a basic block can have many regions. As in the EdgCF technique, the SGR register holds the current region signature, and at the end of each region, the RCF technique updates the SGR register according to the next (successor) region signature, in accordance with one embodiment. As described herein, the signature Lx is attributed to region Rx; for example, the signature associated to R1 is L1, and for R1C, is L1C.

Figure 7:
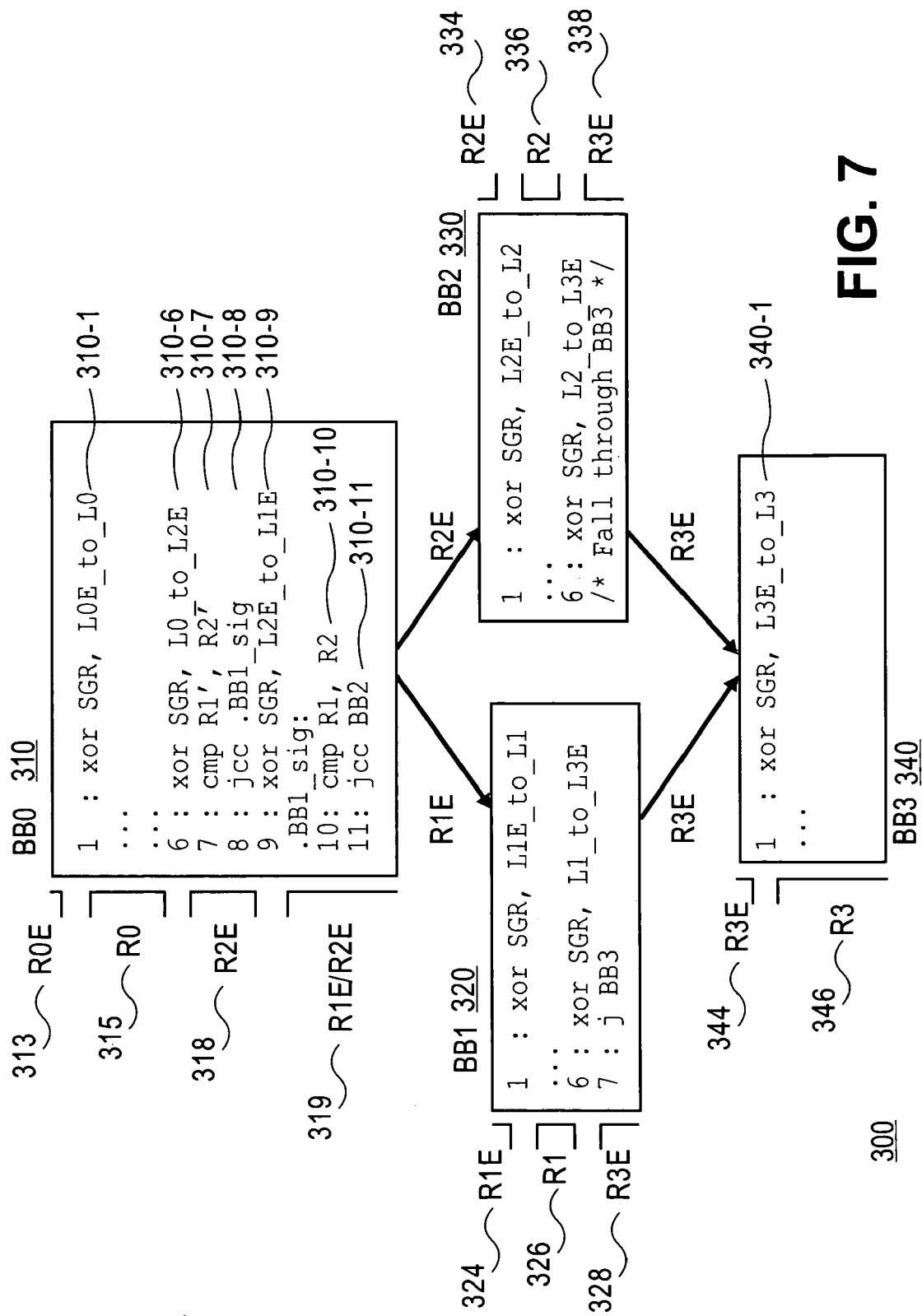
FIG. 7 is a block diagram further illustrating the CFG of FIG. 4 according to a region-based control flow checking technique, in accordance with one embodiment.

FIG. 7 is a control flow graph 300 illustrating basic blocks 310-340, which are subdivided into a plurality of regions to illustrate the region based control flow technique, in accordance with one embodiment. Region R1 315 comprises the original basic block instructions (other than the branch). Region R1E 313 is attributed to the basic block entrance. A region could be assigned for each instruction, but the code performance and code footprint size would be prohibitive. Instructions 310-6 to 310-9 are used to update the SGR with the next two basic blocks signatures (L1E and L2E).

As should be recognized, after the signature update in BB1 310, there is a region 319 with two possible signatures (L1E and L2E). Hence, if, due to a fault, the control flow jumps between two regions with different signatures, the SGR will not match the current (wrong) region signature, and the same happens to each update to SGR. Since only one fault model is considered, the control flow correctness would only be checked at the end of the program (or function).

FIG. 7 has an issue in basic block BB0 310. If the instruction 310-8 (used to help update the SGR) jumps directly to basic block 330 with signature RE3, a fault occurs, but the signature is correct. Therefore, the RCF technique is not able to detect the fault. This happens because the branch instruction 310-8 and the target 330 have the same region signature (L2E). In one embodiment, a new region is created to the update signature code in BB 310 as shown in FIG. 8.

Figure 8:
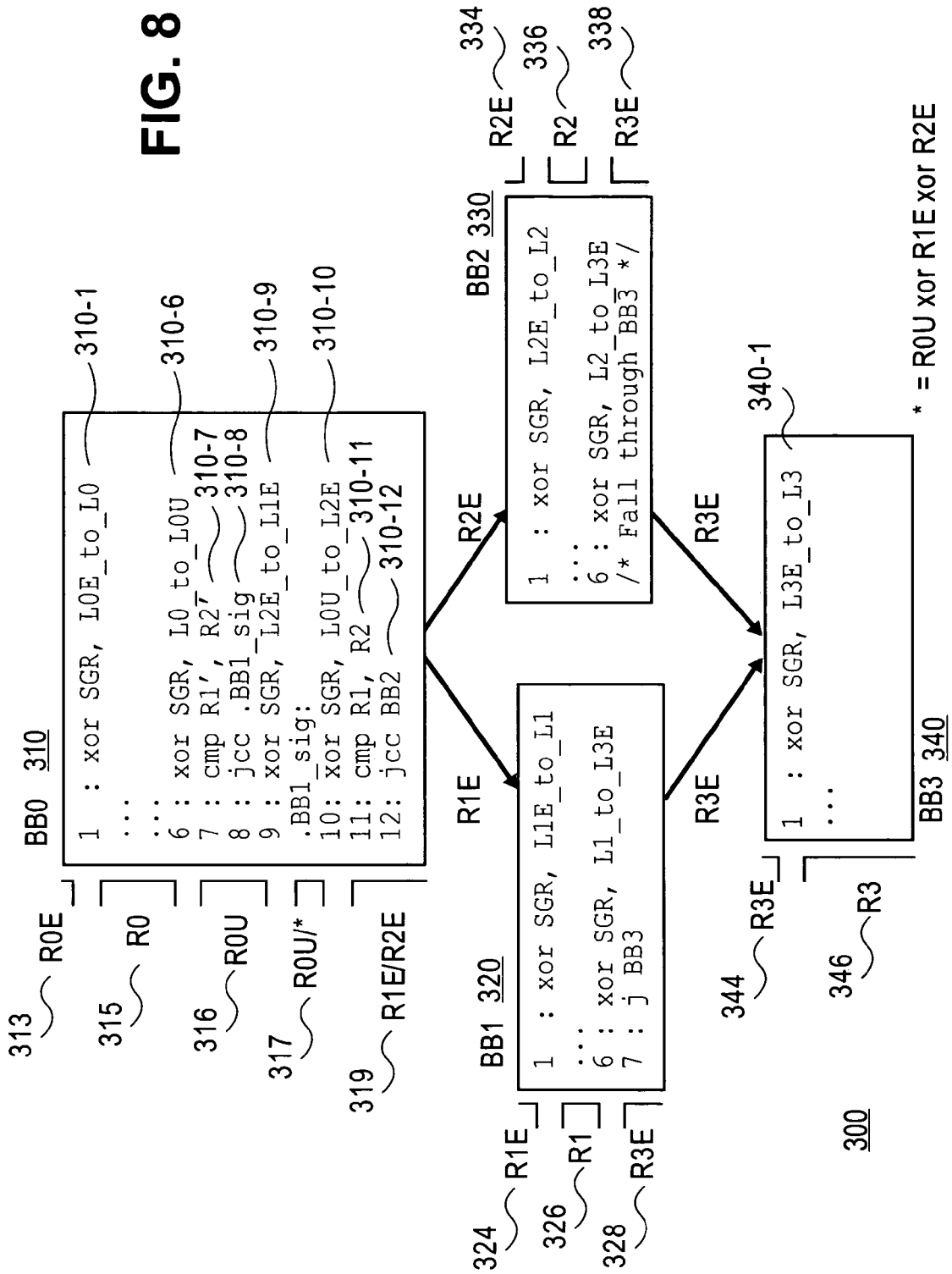
FIG. 8 is a block diagram further illustrating the CFG of FIG. 7, in accordance with one embodiment.

FIG. 8 illustrates program code to detect control flow jumps between two regions with the same signature, according to one embodiment. Representatively, region 317 includes signature (L0U/*). Hence, there are two correct signatures in region 317: L0U and "LOU XOR L1E XOR L2E.". This signature is generated due to the inversion in the order of execution of the update signature instructions ("XOR"). Therefore the intermediate result is a value corresponding to "L0U XOR L1E XOR L2E," because the L2E_to_L1E transformation 310-9 was applied before the L0U_to L2E transformation 310-10.".

Figure 9:
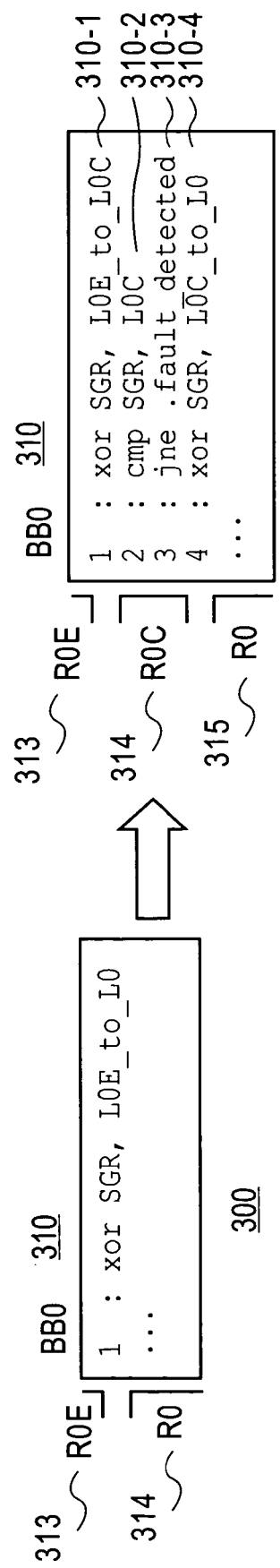
FIG. 9 is a block diagram further illustrating the basic block of FIG. 8 to provide region-based control flow checking, in accordance with one embodiment.

FIG. 9 illustrates one embodiment to check the control flow using a branch instruction, in which a new region 314 is created, so faults can be detected that occur in the branch instruction used to check the control flow. In one embodiment, the SGR register at the end of basic blocks is updated using the same approach in EdgCF technique. This approach may update the signature three times in each basic block.

Accordingly, as shown in FIGS. 7-9, regions R0 315, R1 326, R2 336 and R3 346 were assigned to the original program instructions (other than branch instructions) of basic blocks BB0 310, BB1 320, BB2 330 and BB3 340, respectively. In addition, regions R0E (313), R1E (324), R2E (334) and R3E (344) were attributed to the input edge of each basic block. Although a region could be assigned to each instruction, such assignment would be cost prohibitive.

Accordingly, as shown in FIG. 9, the transformation to the basic block to check the signature in the beginning of the basic block enables the detection of control flow errors in the branch instructions inserted within basic blocks to implement the RCF technique. Accordingly, new region RC0 314 is provided, such that, if a fault occurs in the branch instruction and control flow jumps to an invalid location, such a fault may be detected. In one embodiment, the new region may be referred to as a "signature checking region." Tables 2 and 3 illustrate pseudo code for implementing the EdgCF technique and the RCF technique.

TABLE 2

PSEUDO CODE TO INSTRUMENT THE PROGRAM WITH THE EdgCF TECHNIQUE

```
// Reset the signature in the beginning of the program
Insert_code_to_reset_the_signature ( );
// Update and check the signature in each basic block;
For each basic block BB, do
    // Insert code to update signature register (SGR) in the beginning of
    // BB;
    // This code update SGR to zero through a transformation
    // function (xor, lea, etc).
    Insert_update_instruction_head ( );
    // Insert code to check the signature register (SGR) right after the
    // code to update the SGR in the beginning of BB;
    Insert_check_signature_instructions ( );
    // Insert code to update the signature register (SGR) in the end of BB;
    // This code updates SGR accordingly to the next basic block
    // signature
    Insert_update_instruction_end ( );
End
```

As indicated in Table 2, the signature is reset at the beginning of a program. Once reset, for each basic block, the signature in each basic block is updated and checked. For each basic block, code to update the signature code is inserted at a head of the basic block. This code updates the SGR register value to contain a predetermined register value (0) through a transformation function (XOR, LEA, etc.). In addition, each basic block is modified to insert signature check code right after the code inserted to update the signature register (SGR) in the beginning of the basic block. In addition, update signature code is inserted at the end of each basic block to update the SGR register to contain a successor basic block signature.

TABLE 3

PSEUDO CODE TO INSTRUMENT THE PROGRAM WITH THE RCF TECHNIQUE

```
// Reset the signature in the beginning of the program
Insert_code_to_reset_the_signature ( );
// Update and check the signature in each basic block;
For each basic block BB, do
    // Insert the code to update the signature register (SGR) in the beginning
    // of BB; This code update SGR to the current basic block signature
    // through a transformation function (xor, lea, etc).
    Insert_update_instruction_head ( );
    // Insert the code to check the signature register (SGR) value in the
    // beginning of BB; This code check if SGR is equal to the current
    // region signature. The branch in the checking code is protected
    // by inserting a new region in the basic block
    Insert_check_signature_instructions ( );
    // Insert the code to update the signature register (SGR) in the end of
    BB;
    // This code updates SGR according to the next basic block signature;
    Insert_update_instruction_end ( );
End
```

Table 3 illustrates pseudo code to implement the RCF technique. The code is similar to the pseudo code for implementing the EdgCF technique; however, for each basic block, the signature is updated after each region and the code to check the signature checks to see if the SGR register value is equal to the region signature. In addition, the branch and the checking code is protected by inserting a new region in the basic block. Subsequently, update signature code is inserted at the end of the basic block, which is used to update the SGR register to a next basic block signature. Procedural methods for implementing one or more of the above-described embodiments are now provided.

Figure 10:
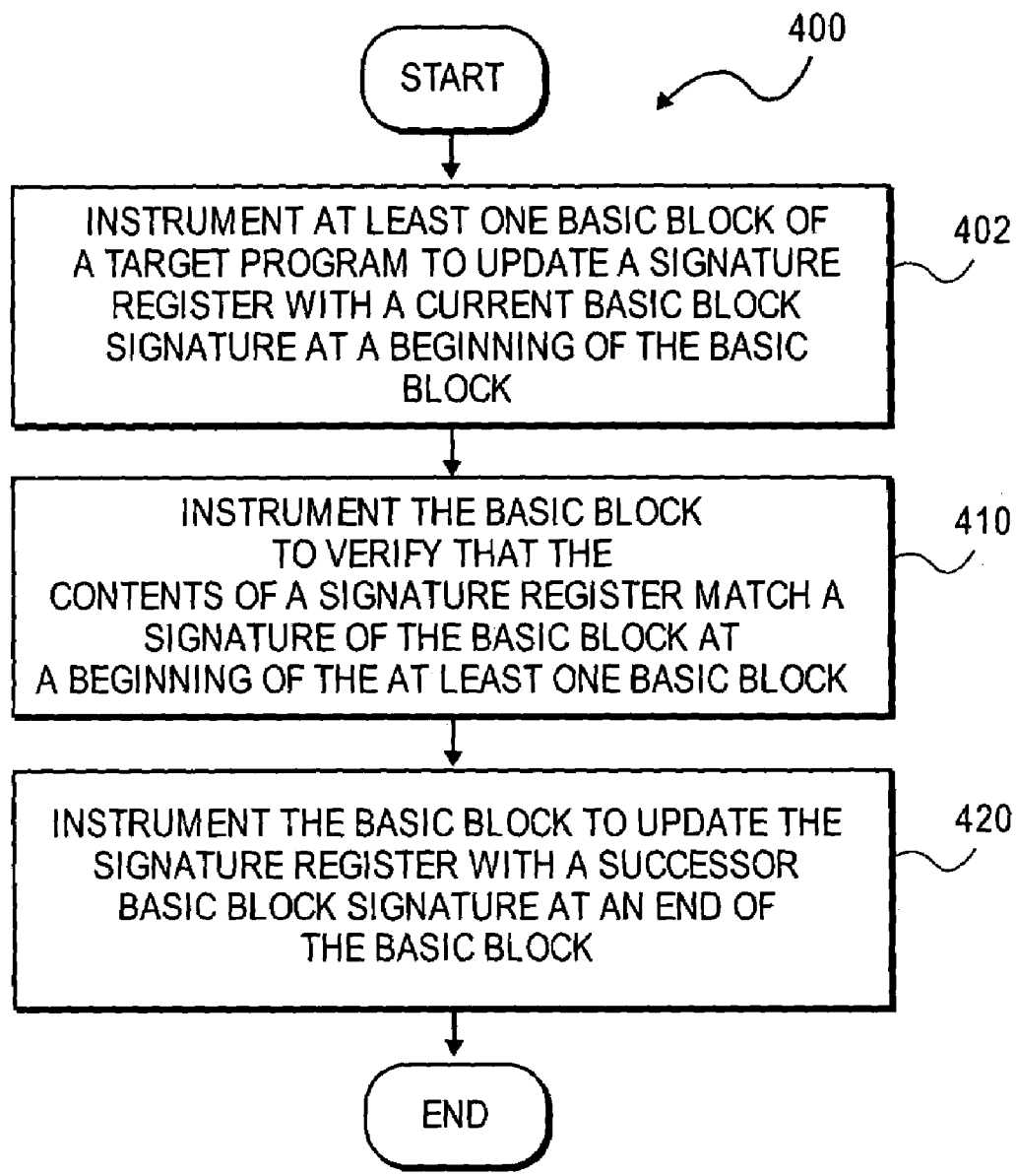
FIG. 10 is a flowchart illustrating a method for edge-based control flow checking, in accordance with one embodiment.

Turning now to FIG. 10, the particular methods associated with various embodiments are described in terms of computer software and hardware with reference to a flowchart. The methods to be performed by a computing device may constitute state machines or computer programs made up of computer-executable instructions. The computer-executable instructions may be written in a computer program and programming language or embodied in firmware logic. If written in a programming language conforming to a recognized standard, such instructions can be executed in a variety of hardware platforms and for interface to a variety of operating systems.

In addition, embodiments are not described with reference to any particular programming language. It will be appreciated that a variety of programming languages may be used to implement embodiments as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 10 is a flowchart illustrating a method 400 for software-based control flow soft error checking, in accordance with one embodiment. In the embodiments described, examples of the described embodiments will be made with reference to FIGS. 1-9. However, the described embodiments should not be limited to the examples provided to limit the scope provided by the appended claims.

Referring again to FIG. 10, at process block 402, at least one basic block of a target program is instrumented to update a signature register (SGR) with a current basic block signature at a beginning of the basic block. For example, as shown in FIG. 5B, instruction 310-1 is inserted at a beginning of basic block 310 to update SGR register with the current basic block signatures. At process block 410, the basic block is instrumented to verify that the contents of a signature register match a signature of the at least one basic block at a beginning of the at least one basic block. For example, as shown in FIG. 5B, instructions 310-2 to 310-3 are inserted at a beginning of basic block 310 to verify that a signature register (SGR) contains a signature (L0) of basic block 310 by using transformation instruction 310-1 and compare instruction 310-2.

In one embodiment, the signature register (SGR) is caused to store a predetermined value if the contents of the signature register match a successor basic block signature. Accordingly, as shown in FIG. 5B, a constant value L0_to_0, when applied to the contents of the SGR register according to the transformation instruction 310-1 will cause the SGR register to contain a predetermined zero value if the SGR register contains a correct predecessor basic block signature. Otherwise, jump instruction 310-3 causes control flow to branch to an error control handler.

Referring again to FIG. 10, at process block 420, the at least one basic block of the target program is instrumented to update the signature register with a successor basic block signature at an end of the basic block. As process blocks 402-420 are repeated, a successor basic block of the at least one basic block is eventually instrumented to verify that contents of the signature register match the successor basic block signature at a beginning of the successor basic block. As indicated above, in one embodiment, the signature register is caused to store a predetermined value if the contents of the signature register match the successor basic block signature.

As shown in FIG. 5B, instructions 310-5 to 310-7 transform contents of the SGR register according to a constant value, such that the SGR register is caused to store successor basic block signature L1 322. Accordingly, within successor basic block 320, instructions 320-1 to 320-3 transform the contents of the SGR register, such that, if the SGR register contains the signature L1 of the successor basic block, the transformation instruction will cause the SGR register to store a zero value.

Figure 11:
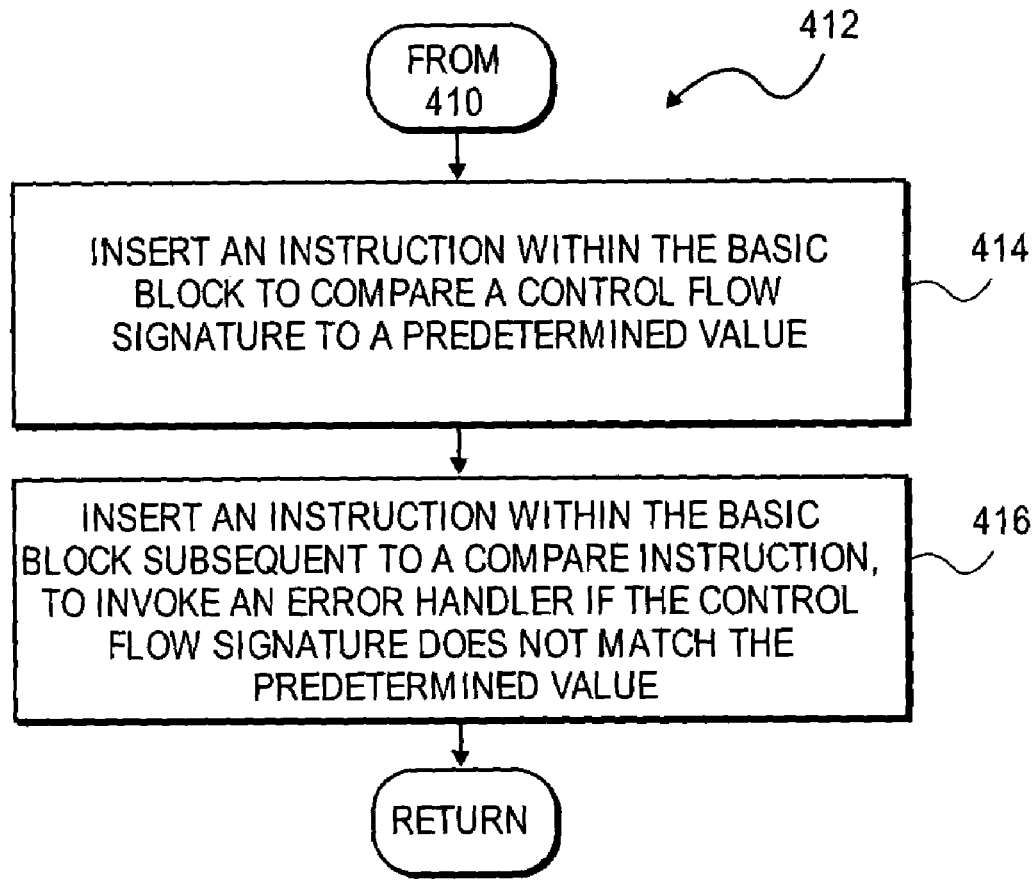
FIG. 11 is a flowchart illustrating a method for instrumenting a basic block to verify a signature of the basic block at a beginning of the basic block, in accordance with one embodiment.

FIG. 11 is a flowchart illustrating a method 412 for instrumenting the at least one basic block to verify the contents of the signature register of process block 410 of FIG. 10, in accordance with one embodiment. In one embodiment, at process block 402 of FIG. 10, a transformation instruction is inserted to combine the contents of the signature register with a constant value to form a control flow signature. For example, as shown in FIG. 5B, the constant value (L0_to_0) is combined with the SGR register according to, for example, an XOR instruction to form a control flow signature.

Referring again to FIG. 11, at process block 414, an instruction is inserted within the basic block to compare the control flow signature to a predetermined value. In one embodiment, the predetermined value is a zero value. Subsequently, at process block 416, an instruction is inserted within the basic block subsequent to the compare instruction to invoke an error handler if the control flow signature does not match the predetermined value. Such instruction is indicated by instruction 320-3, as shown in FIG. 5B.

Figure 12:
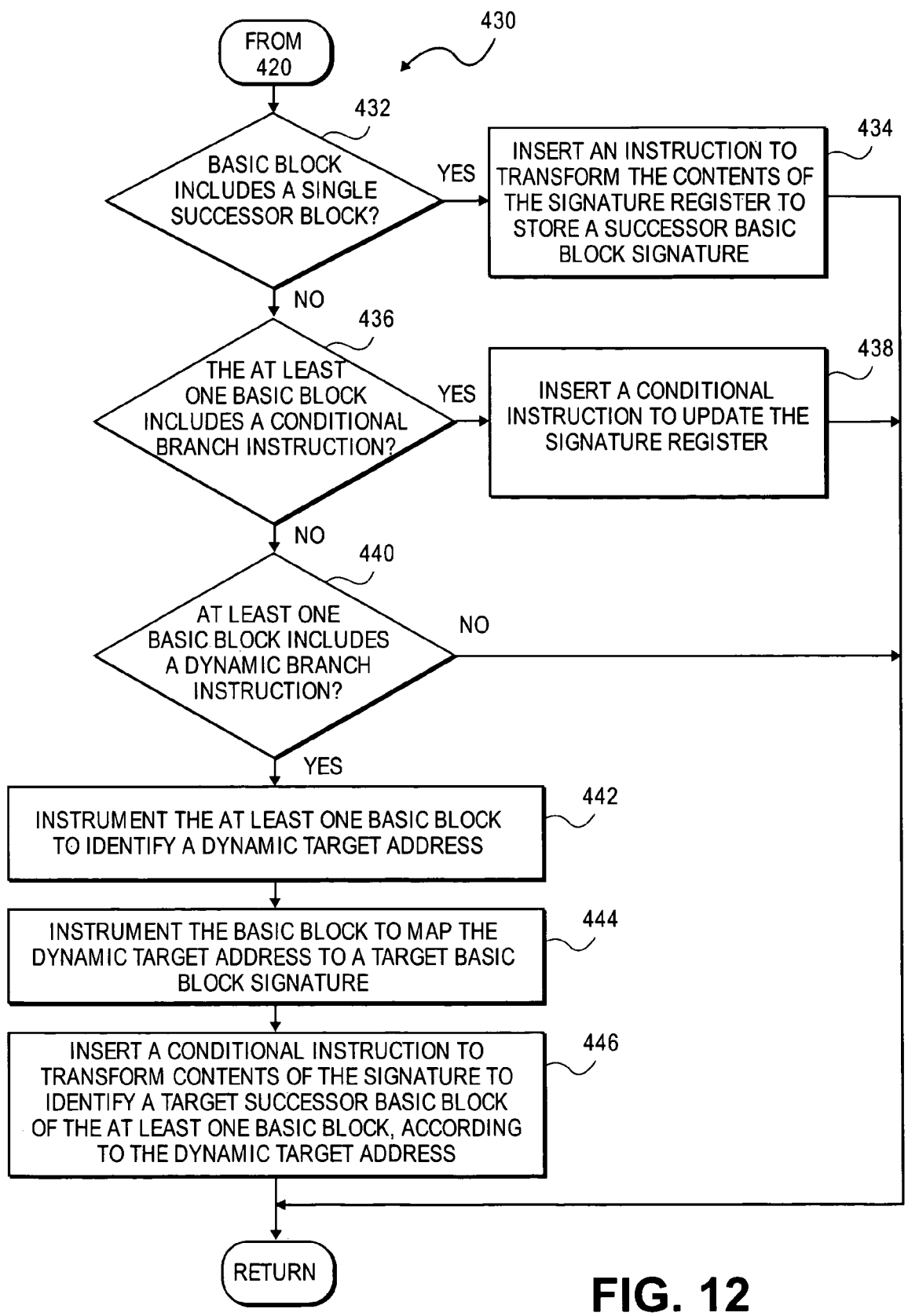
FIG. 12 is a flowchart illustrating a method for instrumenting a basic block to update a signature register with a successor basic block signature, in accordance with one embodiment.

FIG. 12 is a flowchart illustrating a method 430 for instrumenting the at least one basic block of a target program of process block 420 of FIG. 10, in accordance with one embodiment. At process block 432, it is determined whether the basic block includes a single successor block. When such is the case, at process block 434, an instruction is inserted within the basic block to transform the contents of the signature register to store a successor basic block signature. Such an embodiment is illustrated in FIG. 5B, where instruction 310-5 is inserted to transform the contents of the SGR register to store a successor basic block signature (L1).

Referring again to FIG. 12, at process block 436, it is determined whether the at least one basic block includes a conditional branch instruction. If such is the case, at process block 436, a conditional instruction is inserted within the basic block to update signature register. Such an embodiment is illustrated with reference to FIG. 6, where instructions 310-6 to 310-10 use a conditional move instruction to determine the value to store within the SGR register.

Referring again to FIG. 12, at process block 440, it is determined whether the at least one basic block includes a dynamic branch instruction. If a dynamic branch instruction is included within the basic block, at process 442, the basic block is instrumented to identify a dynamic target address. At process block 434, the basic block is instrumented to map the dynamic target address to a target basic block signature. At process block 446, a condition instruction is inserted within the basic block to transform contents of the signature register to identify a target successor basic block of the at least one basic block according to the dynamic target address. In one embodiment, an address of a first instruction within a target basic block may be used as the target basic block signature to avoid the cost of mapping the address to the signature.

Accordingly, as shown in FIGS. 10-12, in one embodiment, each basic block is instrumented with three new pieces of code. Representatively, three new pieces of code are inserted into the basic block (notice that a piece of code may be a single instruction or a sequence of instructions):

(1) Code A to update the SGR using the current BB signature, which is placed in the very beginning of the basic block;

(2) Code B to check the SGR using the current BB signature, which is placed right after the Code A in step 1 (update SGR code); and (3) Code C to update the SGR according to the next basic block(s) signature(s), which is placed in the end of the basic block, right before the branch jump instruction. (Note: if the basic blocks does not have a jump instruction in the end, Code C is placed in the very end of the basic block.)

Figure 13:
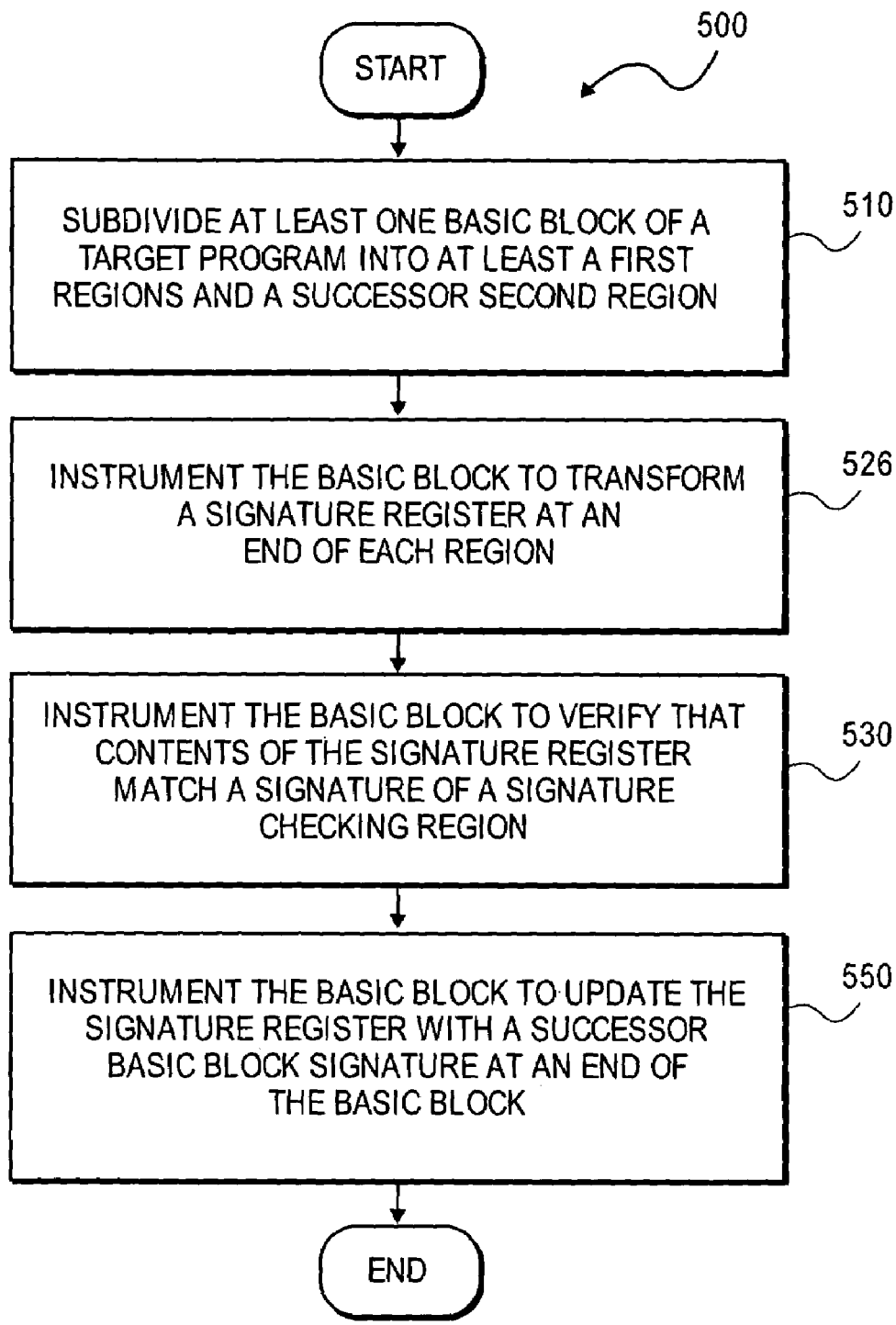
FIG. 13 is a flowchart illustrating a method for regional-based control flow checking, in accordance with one embodiment.

FIG. 13 is a flowchart illustrating a method 500 for providing region based control flow (RCF) checking, in accordance with one embodiment. In one embodiment, region based control flow checking is described with reference to FIGS. 7-9. At process block 510, at least one basic block of a target program is subdivided into at least a first region and a successor second region. For example, as shown in FIG. 7, basic block BB0 310 is subdivided into entry region R1E 313, region R1 315, region R2E 318 and region R1E/R2E 319.

Referring again to FIG. 13, at process block 526, the basic block is instrumented to transform a signature of the basic block, stored within the signature register, into a signature of the first region prior to the first region. For example, as shown in FIG. 7, instruction 310-1 transforms the contents of a signature register (SGR) according to a constant value (R0E_to_R0) at a beginning of R0 region 315. At process block 530, the basic block is instrumented to verify that contents of the signature register match the signature register of the first region prior to the first region. For example, as shown in FIG. 9, signature checking region ROC 314 is added to basic block 310 to verify that the signature register (SGR) matches a signature of ROC region 314.

Referring again to FIG. 14, at process block 540, the basic block is instrumented to update the signature register with the signature register of the successor second region between the first region and the second region. For example, as shown in FIG. 9, instruction 310-4 updates the signature register to store the signature of R1 region 315 at a beginning of R1 region 315. Referring again to FIG. 14, at process block 550, the at least one basic block of the target program is instrumented to update the signature register of the successor basic block signature at an end of the basic block. In one embodiment, such update is performed as described according to the EdgCF control flow checking, as illustrated with reference to FIGS. 10-12.

Accordingly, the EdgCF and RCF techniques are able to detect each branch area category as listed in Table 1. In contrast, conventional techniques are unable to cover each of the branch error categories illustrated in Table 1. EdgCF and RCF techniques are very suitable for future multicore processors. These processors will require smaller feature sizes resulting in smaller transistors with tighter error margins, therefore, they will be more susceptible to soft errors. In one embodiment, using the RCF and EdgCF techniques, the most important application, such as operating system applications or other critical applications may be protected against such soft errors by detection of such soft errors using the EdgCF and RCF techniques to improve the reliability of control flow in such systems. In addition, the software-based approach provided by the EdgCF and RCF techniques can reduce hardware costs and provide for a flexible reliability model that OS and applications selectively use in different application domains.

Elements of embodiments of the present invention may also be provided as a machine-readable storage medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, or other type of machine-readable storage media suitable for storing electronic instructions. For example, embodiments described may be downloaded as a computer program which may be transferred from a remote computer (e.g., a server) to a requesting computer (e.g., a client) by way of data signals embodied in a machine-readable transmission medium including a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

In the above detailed description of various embodiments, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived there from, such that structural and logical substitutions and changes may be made without departing from the scope of this disclosure. The following detailed description, therefore, is not to be taken in a limiting sense, and the scope of various embodiments is defined only by the appended claims, along with the full range of equivalents to which such claims are entitled.

Having disclosed embodiments and the best mode, modifications and variations may be made to the disclosed embodiments while remaining within the scope of the embodiments as defined by the following claims.

What is claimed is:

1. An article of manufacture having a machine-readable storage medium including associated instructions, wherein the instructions, when executed, result in the machine performing:
   subdividing at least one basic block of a target program into a plurality of regions;
   instrumenting each region to transform a current region signature within a signature register into a successor region signature at an end of each of the plurality of regions;
   instrumenting the basic block to include a signature checking region, the signature checking region to verify that contents of the signature register match a signature of the signature checking region; and
   instrumenting the basic block to update the signature register with a successor basic block signature at an end of the basic block; and
   inserting a transformation instruction to combine the contents of the signature register with a constant value to form a control flow signature during runtime of the target program.

2. The article of manufacture of claim 1, wherein the machine accessible medium further comprises data, which when accessed, results in the machine further performing:
   subdividing at least one basic block of a target program into at least a first region and a successor second region;
   instrumenting the basic block to transform a signature of the basic block, stored within a signature register, into a signature of the first region prior to the first region;
   instrumenting the basic block to verify that contents of the signature register match the signature of the first region prior to the first region; and
   instrumenting the basic block to update the signature register with a signature of the successor second region between the first region and the successor second region.

3. The article of manufacture of claim 2, wherein instrumenting the at least one basic block further results in the machine performing:
   inserting a conditional instruction to update the signature register if the at least one basic block includes a conditional branch instruction.

4. The article of manufacture of claim 2, wherein instrumenting the at least one basic block further results in the machine performing:
   instrumenting the at least one basic block to identify a dynamic target address if the at least one basic block includes a dynamic branch instruction;
   instrumenting the basic block to map the dynamic target address to a target basic block signature; and
   inserting a conditional instruction to transform contents of the signature register to identify a target successor basic block of the at least one basic block, according to the dynamic target address.

5. The article of manufacture of claim 2, wherein instrumenting the basic block to verify further results in the machine performing:
- inserting a transformation instruction to combine the contents of the signature register with a constant value to form a region signature;
- inserting an instruction within the basic block to compare the region signature to the signature of the first region; and
- inserting an instruction within the basic block subsequent to a compare instruction, to invoke an error handler if the region signature does not match the signature of the first region.

6. A system comprising:
- a processor;
- a memory controller coupled to the processor; and
- a memory coupled to the memory controller, the memory controller including a binary translator to instrument at least one basic block of a target program to include signature update code to update a signature register with a current basic block signature at a beginning of the basic block, to instrument the basic block to verify that contents of the signature register match a signature of the basic block subsequent to the signature update code and to instrument the basic block to update the signature register with a successor basic block signature at an end of the basic block;
- wherein the translator is further to subdivide the at least one basic block of the target program into at least a first region and a successor second region, to instrument the basic block to transform a signature of the basic block, stored within a signature register, into a signature of the first region prior to the first region, and to instrument the basic block to verify that contents of the signature register match the signature of the first region prior to the first region.

7. The system of claim 6, wherein the translator is further to instrument the basic block to update the signature register with a signature of the successor second region between the first region and the successor second region.

8. The system of claim 6, wherein the translator is further to insert a transformation instruction to combine the contents of the signature register with a constant value to form a region signature, to insert an instruction within the basic block to compare the region signature to the first region signature, and to insert an instruction within the basic block subsequent to a compare instruction, to invoke an error handler if the region signature does not match the first region signature.

9. The system of claim 6, wherein the translator is further to instrument the successor basic block to update the signature register with a next successor basic block signature of a next successor block of the successor basic block at an end of the successor basic block.

* * * * *